United States Patent [19]
Straubinger et al.

[11] Patent Number: 5,542,965
[45] Date of Patent: Aug. 6, 1996

[54] PROCESS AND INSTALLATION FOR REMOVING SOLVENT VAPOR FROM EXHAUST AIR

[75] Inventors: Werner Straubinger, Nürnberg; Günter Pecher, Sugenheim; Richard Kohlmann, Burgtann, all of Germany

[73] Assignee: U.E. Sebald Druck und Verlag GmbH, Nurberg, Germany

[21] Appl. No.: 341,077

[22] Filed: Nov. 17, 1994

[30] Foreign Application Priority Data

Nov. 18, 1993 [DE] Germany ............... 43 39 422.1
Mar. 21, 1994 [DE] Germany ............... 44 09 622.4

[51] Int. Cl.⁶ ............................................. B01D 53/04
[52] U.S. Cl. ...................... 95/14; 95/115; 95/143; 95/144; 95/148; 96/112; 96/115; 96/122; 96/128; 96/130; 96/133; 96/145
[58] Field of Search .................. 95/1, 14, 114, 95/115, 141–148; 96/112, 115, 122, 126–128, 130, 133, 144, 145

[56] References Cited

U.S. PATENT DOCUMENTS

| | | | |
|---|---|---|---|
| 1,753,067 | 4/1930 | Ray et al. | 95/141 X |
| 2,114,810 | 4/1938 | Ray | 95/148 X |
| 3,055,157 | 9/1962 | Lavery et al. | 95/1 |
| 3,121,002 | 2/1964 | Kilgore et al. | 95/143 X |
| 3,124,438 | 3/1964 | Lavery | 95/14 |
| 3,241,294 | 3/1966 | Walker et al. | 96/115 X |
| 3,378,992 | 4/1968 | Peirce et al. | 95/143 |
| 3,479,797 | 11/1969 | Spencer et al. | 96/122 X |
| 3,527,024 | 9/1970 | McMinn et al. | 95/115 |
| 3,540,188 | 11/1970 | Barrere, Jr. et al. | 95/143 X |
| 3,876,397 | 4/1975 | Taylor | 96/115 |
| 3,884,661 | 5/1975 | Simonet | 95/148 |
| 4,056,369 | 11/1977 | Quackenbush | 95/115 X |
| 4,104,039 | 8/1978 | Kuri et al. | 95/141 X |
| 4,203,734 | 5/1980 | Winter et al. | 95/115 |
| 4,282,015 | 8/1981 | Bartoschek et al. | 96/112 |
| 4,409,006 | 10/1983 | Mattia | 95/141 X |
| 4,414,003 | 11/1983 | Blaudszun | 95/141 X |
| 4,421,532 | 12/1983 | Sacchetti et al. | 95/141 X |
| 4,516,988 | 5/1985 | Winter | 95/141 |
| 4,531,951 | 6/1985 | Burt et al. | 55/23 |
| 4,565,553 | 1/1986 | Nowack | 95/141 |
| 4,846,852 | 7/1989 | Schweitzer et al. | 95/141 X |
| 4,859,216 | 8/1989 | Fritsch | 96/112 X |
| 4,941,894 | 7/1990 | Black | 95/14 |
| 4,963,168 | 10/1990 | Spencer | 96/122 |
| 4,966,611 | 10/1990 | Schumacher et al. | 95/141 X |
| 4,986,836 | 1/1991 | Tandon | 96/127 X |
| 5,015,365 | 5/1991 | Vara et al. | 95/142 X |
| 5,118,328 | 6/1992 | Wnuk et al. | 95/148 X |
| 5,125,935 | 6/1992 | Nakaya et al. | 95/141 X |
| 5,389,125 | 2/1995 | Thayer et al. | 95/115 X |

FOREIGN PATENT DOCUMENTS

| | | |
|---|---|---|
| 422463 | 4/1991 | European Pat. Off. . |
| 2352075 | 3/1975 | Germany . |
| 2928138 | 1/1981 | Germany . |

*Primary Examiner*—Robert H. Spitzer
*Attorney, Agent, or Firm*—Sughrue, Mion, Zinn, Macpeak & Seas

[57] ABSTRACT

In a process and installation for removing solvent vapor from exhaust air sucked from a working space, the air is fed to at least two parallel activated carbon adsorbers. Each adsorber can be switched to and fro between a charging mode in which it adsorbs solvent vapors from the exhaust air flowing through the adsorber, and a regeneration mode in which it is separated from the flow of exhaust air and flushed with water vapor and desorbed. To save energy and to reduce environmental pollution, at the end of the regeneration period each adsorber has a drying phase in which exhaust air from the working space flows through the adsorber, the air thereafter being fed to an adsorber which is operating in the charging mode. In the periods in which an adsorber is operating in the charging mode, it firstly has an initial phase followed by a main phase wherein air flows from adsorbers which are in the main phase are returned directly into the working space while the air flow from an adsorber which is in the initial phase is kept separate from the first-mentioned air flows.

22 Claims, 1 Drawing Sheet

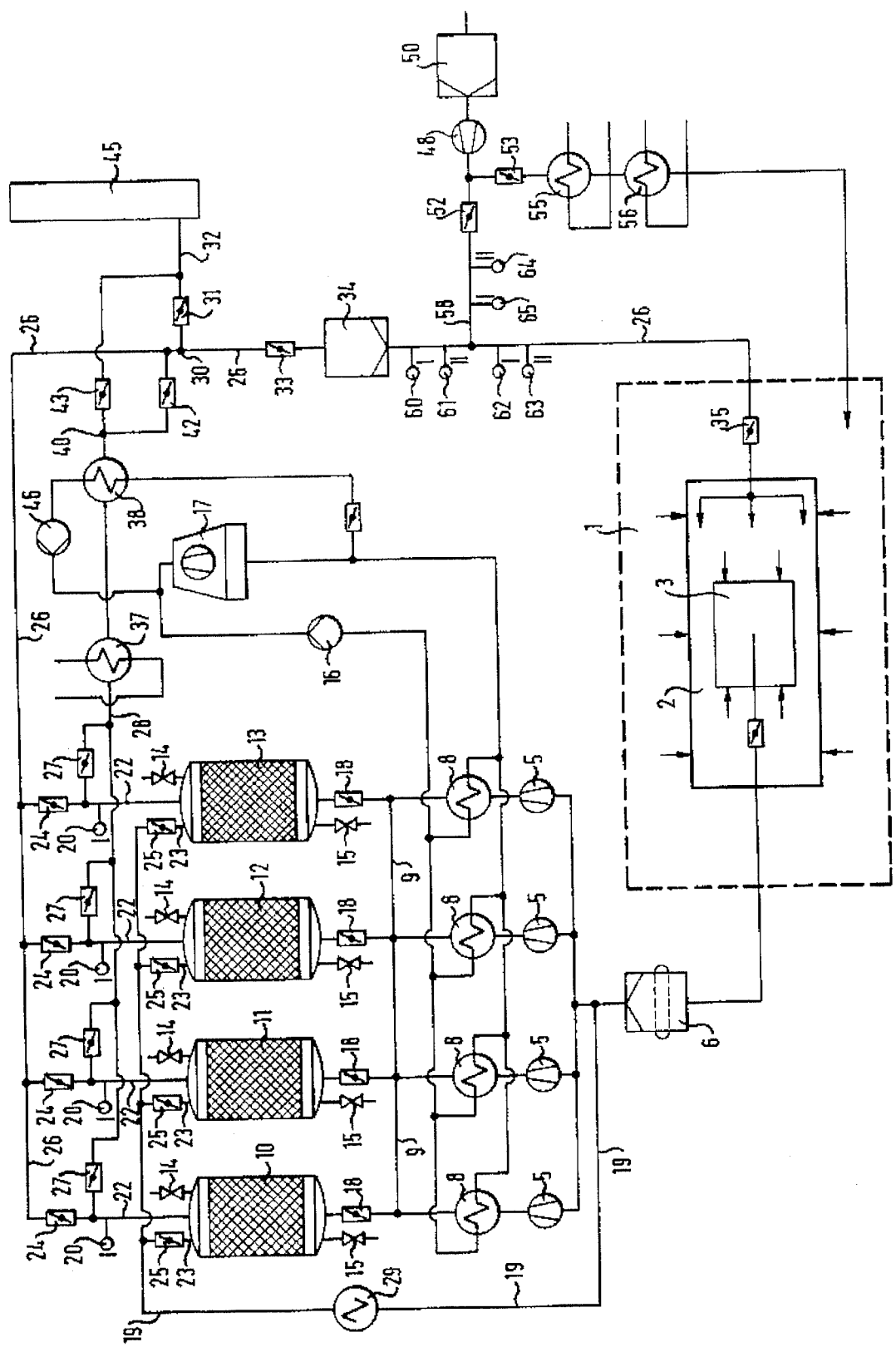

PROCESS AND INSTALLATION FOR REMOVING SOLVENT VAPOR FROM EXHAUST AIR

BACKGROUND OF THE INVENTION

The present invention concerns a process and an installation for removing solvent vapors from exhaust or waste air.

There are various situations in which there is a need for solvent vapor to be removed from exhaust or waste air, for example inter alia in printing works where, in particular in the area of rotary intaglio printing, toluene which is used as a solvent for the printing inks and which in operation of the printing machine is discharged into the air in the working space not only has to be removed from the working space but also separated out of the exhaust air which is sucked out of the working space, and recycled so that the toluene can be used again. A process and installation for performing those operations are to be found for example in 'Haus der Technik' lecture publications 404 (1978), pages 98 ff.

The above-described operating procedure is effected by means of activated carbon adsorbers from which the cleaned exhaust air issues in a pratically solvent-free condition. In actual fact the residual solvent content in the exhaust air, at about 20 $mg/m^3$, is so far below the limit value of 100 $mg/m^3$ which is required by the present statutory provisions in the Federal Republic of Germany (such air being air to be discharged into the atmosphere by way of a chimney or the like.

As an activated carbon adsorber can remove impurities from the exhaust air which flows therethrough and which requires cleaning therein, only until loading of such impurities has reached a certain limit value, the adsorber must switch between two operating modes. The one operating mode is the above-described charging mode during which the contaminated exhaust air flows through the adsorber in an upward direction, the solvent vapors being adsorptively bound by the activated carbon layers. When the adsorption capacity of the activated carbon is fully used up, the adsorber is automatically separated from the flow of exhaust air and switched over into a regeneration mode in which saturated water vapor or steam is fed to the adsorber by way of a valve so that the vapor flows through the activated carbon in a downward direction, during which time the activated carbon bed is heated and the adsorptively bound solvent is desorbed. The mixture of vapors which is produced in that case is condensed and fed to a piece of equipment in which the solvent is separated from the water and thus maintained in such a pure condition that it can be re-used.

When the adsorber has been regenerated, the feed of water vapor is terminated and the adsorber is put back into the charging mode condition again in which the exhaust air to be cleaned flows through it.

When this operating procedure is used in the context of printing, in order not to disturb continuous operation of the printing machines by virtue of the fact that solvent adsorption is not possible during the regeneration period, the installation involved in carrying out the operating procedure usually has a plurality of adsorbers which are operated in parallel and the number of which is so great that, when one of the adsorbers is operating in the regeneration mode, the adsorption capacity or cleaning capacity of the other adsorbers is sufficient to produce the required cleaning effect for the exhaust air which is to be sucked out of the working space in which the printing equipment is disposed, for removal of the solvent vapors produced by the machines. In that situation the adsorbers are operated in opposite relationship at least from time to time, in such a way that at least one of the adsorbers is in the regeneration mode while at least one other adsorber is operating in the charging mode.

In order to keep the concentration of solvent at the working location below the prescribed values, a considerable amount of air must be removed from a printing room in which one or even a plurality of rotary intaglio printing machines are operating, and that amount of air, per printing machine, may be of the order of magnitude of up to 150,000 $m^3$/hour. Admittedly, the air is not sucked away directly in the printing room itself, but rather the air is sucked out of the machine hoods which cover over the rotary intaglio printing machines, or from the drying devices of the printing mechanisms, which however are open on their feed flow side to the printing room. So that the slight reduced pressure which is desired in relation to the outside air is maintained within the printing room, the printing room must be supplied with an amount of conditioned fresh air which corresponds to the amount of air that is sucked out of the printing room. The fresh air is air which is sucked in out of the surrounding atmosphere. That air must be filtered to separate off dust and other solid particles, heated or cooled to the required temperature, and possibly also adjusted to a desired value in respect of its moisture content or humidity. So that those conditioning operations can be carried out for the large amounts of air indicated above, the equipment involved requires correspondingly large fresh air blowers and conditioning installations, and operation thereof involves a considerable level of energy expenditure.

SUMMARY OF THE INVENTION

The invention is based on the object of providing a process for removing solvent vapors from exhaust air, which can afford an at least reasonable reduction in the level of apparatus expenditure and energy costs.

Another object of the present invention is to provide a process for removing solvent vapor from exhaust air which affords an enhanced level of reliability and efficiency in solvent removal and which gives better operating results in terms of the solvent removed and the air from which the solvent is removed.

Still another object of the present invention is to provide a process for removing solvent vapor from exhaust air, more specifically from printing equipment, which permits the cleaned air to be recycled.

A still further object of the present invention is to provide an installation for removing solvent vapor from exhaust air, which is of enhanced efficiency and reliability such as to permit the cleaned air to be recycled.

In accordance with the present invention the foregoing and other objects are attained by a process for removing solvent vapors from exhaust air which is sucked out of a working space and cleaned by means of at least two activated carbon adsorbers which are arranged in mutually parallel relationship and each of which runs through operating cycles which each comprise a charging period in which the exhaust air flows through the adsorber and the adsorber adsorbs the solvent vapors contained in the exhaust air, and a regeneration period in which the adsorber is separated from the flow of exhaust air and water vapor flows through the adsorber. That water vapor desorbs and flushes out the previously adsorbed solvent. The working cycles of the at least two adsorbers are displaced relative to each other in respect of time in such a way that at least one of the adsorbers is always working in the charging mode, thereby to achieve a continuous adsorption procedure. Each regeneration period includes a concluding drying phase in which, instead of water vapor, exhaust air from the working space flows through the adsorber in question. After leaving said adsorber that exhaust air is fed to the at least one adsorber which in that period is working in the charging mode. Each charging period includes an initial phase and a subsequent main phase. The phases are determined by virtue of the fact that the air flow issuing from an adsorber which is in the initial phase of a charging period is fed to a separate treatment while the air flow issuing from an adsorber which is in the main phase of a charging period is returned directly into the working space.

In a further aspect in accordance with the present invention the foregoing and other objects are achieved by an installation for removing solvent vapors from exhaust air, comprising blowers for sucking the exhaust air out of a working space, and at least two activated carbon adsorbers arranged in mutually parallel relationship. A flap arrangement is controllable by a control means and, for each of the at least two adsorbers, includes an inlet flap which in the opened condition communicates it with the associated blower and an outlet flap which in the opened condition passes the air issuing from the adsorber into a main flow path, so that each of the adsorbers can be switched to and fro between a charging mode in which the exhaust air to be cleaned flows through the adsorber and the adsorber adsorbs the solvent contained in the exhaust air, and a regeneration mode in which the adsorber is separated from the flow of exhaust air and water vapor can flow through the adsorber, the water vapor desorbing and flushing out the adsorbed solvent. The switching action between the charging and the regeneration modes occurs alternately in such a way that at least one of the adsorbers is always operating in the charging mode. A discharge means permits air which has flowed through one of the adsorbers to be expelled into the surrounding atmosphere. For each adsorber the controllable flap arrangement further includes a second outlet flap which in the opened condition communicates the adsorber with a conduit by way of which air issuing from the adsorber can be returned to the flow path leading from the working space to the adsorbers so that air from the working space, which flows through an adsorber in a drying phase which concludes the adsorber regeneration period when the inlet flap is open and the first outlet flap is closed, can be fed by way of the opened second outlet flap to the at least one adsorber which is operating in the charging mode, and an auxiliary outlet flap which in the opened condition communicates the adsorber with an auxiliary flow path so that air from the working space, which flows through the adsorber in an initial phase of its charging period when the inlet flap is open and the first and second outlet flaps are closed, can be fed by way of said auxiliary flow path to a separate treatment. The main flow path is communicated with the working space so that air from the working space, which flows through the adsorber in a main phase, following the initial phase, of its charging period, can be returned into the working space after cleaning of said air.

As will be seen from the following description of a preferred embodiment of the invention, the invention is based on the following considerations:

In the previous operating procedure as discussed above, recycling of the cleaned exhaust air issuing from the adsorbers to the working area or space is not meaningful in economic terms. That is because in that procedure all air flows issuing from the adsorbers are mixed together immediately downstream of the adsorbers. As a result, the very hot and very moist flow of air issuing from an adsorber which is in the initial phase of a charging mode is admittedly considerably cooled. At the same time however, it so greatly heats up the total air flow coming from the adsorbers, and introduces into that air flow such a large amount of moisture, that the expenditure which has to be made to provide a cooling action and to remove moisture from the total air flow in order to condition it to such an extent that it can be recycled to the working space, is considerably greater than the expenditure required for conditioning the fresh air which is sucked in from the ambient atmosphere. Accordingly, in that prior procedure, it was less expensive for the cleaned exhaust air to be completely discharged into the atmosphere and replaced by fresh air which was drawn from the atmosphere at another location.

The present invention therefore now provides as a first step that, just before the termination of each regeneration period of an adsorber, the adsorber, instead of being supplied with water vapor or steam, is supplied with exhaust air from the working space, during a drying phase which lasts for only a few minutes. Because the level of adsorption efficiency of the adsorber which is hot and moist throughout is still very low at that time, the air, after issuing from that adsorber, is not only very hot and charged with water vapor, but it is also charged with solvent vapors. It is therefore not mixed with the air which is discharged from the adsorbers that are operating in the charging mode. On the contrary, after the air has preferably been cooled down and moisture removed therefrom by means of a condenser, in which operation the toluene contained therein cannot be separated therefrom, the air is returned to the flow path leading from the working space to the adsorbers which are operating in the charging mode and by which the air is purified of solvent vapors in the necessary fashion.

In that drying step the exhaust air already flows through the adsorber in an upward direction, that is to say in the direction in which it also flows in the subsequent charging mode. In flowing through the adsorber in that way, it already dries and cools the lowermost layers of the adsorber bed, to such an extent that, after a short time, the installation can be switched over to the charging mode. Although a totally sufficient cleaning effect in respect of the exhaust air is already achieved at the beginning of that charging mode, by virtue of the above-mentioned lowermost layers of the adsorber bed, the upper layers of the adsorber bed still impart a very large amount of heat and moisture to the air flowing through the adsorber.

It is here that, in a second step, the invention now makes use of the fact that the exhaust air is at the above-mentioned high temperature and moisture values, only for an initial phase which is short in comparison with the overall duration of the charging period, and the invention also makes use of the fact that in particular the relative moisture content of the exhaust air has already fallen from about 100% to a readily acceptable value, between about 10 and 12 minutes after the beginning of a new charging phase. The value to which the relative moisture content falls approximately corresponds to that of the air which is discharged by adsorbers which have already been operating in the charging mode for a prolonged period of time.

If therefore, during that initial phase of each new charging period, the cleaned air which is discharged by the respective adsorber is kept separate from the air flows from the other adsorbers which are already operating in the main phase of the charging mode, then the exhaust air thereof can be recycled to the working space without the need for special conditioning thereof.

The hot moist exhaust air flow which is kept separate and from which solvent has been satisfactorily removed can either be discharged directly into the ambient atmosphere or it can be conditioned for it to be recycled to the working space, at a cost which is considerably lower than the cost involved in corresponding conditioning of the total air flow when immediately mixed after leaving the adsorbers. In particular the process according to the invention permits a highly flexible operating procedure. Thus for example at high outside temperatures the hot moist air from the initial phase can be discharged directly to the ambient atmosphere while, at lower outside temperatures, it is recycled to the working space, after comparatively little cooling, so that the residual heat contained in the air serves for heating purposes.

It will be seen that, by virtue of the procedure and apparatus according to the invention, the working space has to be supplied with only a fraction of the amount of fresh air which is required in accordance with the above-discussed prior procedure. The input of energy permanently required and also the level of apparatus expenditure required for conditioning the air that is fed to the working space are also correspondingly lower. Another particular advantage of the process and installation according to the invention lies in their effects in terms of reducing environmental pollution. Such effects provide that the recycling of the major part of the exhaust air means that even less solvent is discharged to the environment. On the other hand the considerably reduced level of energy expenditure also contributes to protecting the environment.

The duration of the initial phase, after the beginning of a new charging period, during which phase the air issuing from a respective adsorber is discharged to the exterior and thus into the open air, can basically be established by means of a time control arrangement. For that purpose, it is possible to ascertain empirically for a given adsorber the length of the period of time after which the above-mentioned clear drop in temperature and in particular relative air humidity has reliably occurred. Taking that time value as a basis, the procedure can then be automatically switched over from feeding the air issuing from the adsorber into the auxiliary flow path, to feeding the air into the main flow path for direct recycling to the working space. It will be appreciated that a necessary condition for that operating procedure is that the properties of the adsorber change only very slightly.

Preferably the temperature of the cleaned exhaust air issuing from the adsorber is to be measured and the operating procedure is to be switched over from a feed of air into the auxiliary flow path to direct recycling to the working space, when the measured temperature has fallen below a predetermined limit value.

Further preferred features of the process and installation according to the invention for carrying out the process are set forth in the accompanying claims.

Further objects, features and advantages of the present invention will be apparent from the following description of a preferred embodiment of the invention.

BRIEF DESCRIPTION OF THE DRAWING

The single FIGURE of the drawing is a diagrammatic view of an exhaust air cleaning installation.

DESCRIPTION OF THE PREFERRED EMBODIMENT

Referring now to the drawing, shown therein is a diagrammatic view of an exhaust air cleaning installation for carrying out a process for removing solvent vapors from exhaust air which is sucked out of a working space, for example in a printing works. In the illustrated installation accordingly solvent vapors which in a printing situation are generally toluene vapors are produced in a printing room 1 and in particular in the printing mechanism driers 3 of a rotary intaglio printing machine, the driers being disposed under a machine hood 2. The solvent vapors are to be removed from the exhaust or waste air from the driers, and recovered for further use thereof.

For that purpose the exhaust air cleaning installation includes four blowers 5 which, by way of a rolling belt filter 6 which serves to retain ink dust and other solid particles, suck the air out of the driers 3 and, by way of same, also out of the machine hood 2. Disposed downstream of each of the blowers 5 is a respective heat exchanger 8. Heat can be removed from the exhaust air which is sucked in by the blowers 5, by means of the respective heat exchangers 8, in order to reduce the temperature of the air from about 45° C. to about 30° C. In that way the level of adsorption efficiency of the subsequent activated carbon adsorbers 10–13 is considerably increased.

The heat exchangers 8 are arranged in parallel relationship with each other, both in regard to the exhaust air from the machinery and also in regard to their respective coolant circuit. The coolant is passed by means of a pump 16 through an open cooling tower 17 in which it can discharge the heat which is removed from the exhaust air from the machinery. Disposed between the manifold conduit 9 which connects the outlets of the heat exchangers 8 together and each of the adsorbers 10–13 is a controllable inlet flap 18, by means of which the respective adsorber 10–13 can be completely separated from the exhaust air flow coming from the filter 6.

Each of the adsorbers 10–13 has two air outlet conduits 23. The first conduit 22 serves to carry away the air which issues from its adsorber in the charging mode and from which solvent vapors have been very substantially removed. In order to be able to measure the temperature of that air, the first conduits 22 each have a respective temperature-measuring sensor 20.

Each of the first conduits 22 is branched in a Y-shape. One of the arms of the respective Y-shape branching is communicated by way of a first controllable outlet flap 24 with a return conduit 26 which serves as a main flow path, while the other of the two arms of the Y-shaped branch communicates by way of a controllable auxiliary outlet flap 27 with an auxiliary flow path 28.

The second air outlet conduits 23 are each communicated with a conduit 19 by way of a second controllable outlet flap 25 and serve to carry air which flows through the associated adsorber during a drying phase concluding the regeneration period, by way of the above-mentioned conduit 19 and a condenser 29 between the filter 6 and the blowers 5, back into the flow path which leads from the working space 2 to the adsorbers 10–13.

Each of the adsorbers 10–13 has a vapor inlet valve 14 and an outlet valve 15 which are opened during the main part of the regeneration period so that the adsorber can be steamed out with steam or water vapor which flows through the adsorber in the opposite direction to the direction of flow of the exhaust air to be cleaned. The inlet valves 14 are fed by a steam or vapor supply apparatus (not shown) while the outlet valves 15 are communicated by way of a conduit (not shown) with a solvent recovery apparatus of which only the condenser 29 is illustrated in the drawing.

The return conduit 26 has a Y-shaped branching 30 of which one arm is communicated by way of a controllable flap 31 with a discharge conduit 32 while the other arm of the branching arrangement goes by way of a controllable flap 33 and a filter 34 which serves to filter out any carbon which is entrained in the return conduit 26 by virtue of attrition and abrasion in the adsorbers 10–13, and leads back into the printing room 1 and therein by way of a further controllable flap 35 into the machine hood 2 in which the return conduit 26 terminates in an open condition.

The auxiliary flow path 28 leads by way of an optional heat exchanger 37 and a heat exchanger 38 which is always provided to a Y-shaped branching location 40 of which one arm is communicated by way of a controllable flap 42 with the return conduit 26 while the other arm of the Y-shape arrangement is communicated by way of a controllable flap 43 with the discharge conduit 32 which is connected to a chimney 45, through which air flowing into the conduit 32 can be discharged into the ambient atmosphere. The coolant circuit of the heat exchanger 38 also goes by way of the cooling tower 17 and is driven by a pump 46.

The installation further includes a blower 48 which serves to suck in by way of a filter 50 fresh air from the surrounding atmosphere. The fresh air is blown under the control of two controllable flaps 52 and 53 either into the return conduit 26 in which it is mixed with the air that is returned from the adsorbers 10–13 and then fed to the machine hood 12, or the air which is sucked in by way of the filter 50 is passed directly to the printing room 1 by way of a heat exchange assembly 55, 56. The heat exchange assembly 55, 56 includes two heat exchangers of which one serves for selectively cooling the fresh air that is sucked in through the filter 50, while the other serves for selectively heating the fresh air. The last-mentioned heat exchanger 56 can be connected together with the heat exchanger 37 in the auxiliary flow path 28 to provide a heat exchange medium circuit. The heat which the heat exchanger 37 removes from the exhaust air flowing through the auxiliary flow path 28 can however also be used otherwise than for heating the fresh air which is sucked in by way of the filter 50.

Arranged on the return conduit 26, upstream and downstream of the region at which the fresh air conduit 58 coming from the blower 48 opens into the conduit 26, are respective moisture and temperature measuring sensors 60, 61 and 62, 63 respectively. The fresh air conduit 58 also has a moisture and a temperature measuring sensor 64 and 65 respectively, immediately upstream of the location at which it connects to the return conduit 26.

The structure of the illustrated installation having been described, the preferred mode of operation thereof is now set out as follows Out of the four adsorbers 10–13 which are operatively disposed in mutually parallel relationship, in any given situation three thereof, for example the adsorbers 10–12, can be in the condition of the charging mode while at the same time the fourth adsorber 13 is being regenerated. For that purpose the air flow from the associated blower 5 is distributed by way of the manifold conduit 9 to the adsorbers 10–12 and the controllable inlet flap 18 leading to the adsorber 13 which is to be regenerated is closed so that the adsorber 13 is separated from the flow of exhaust air coming from the filter 6.

The controllable flaps 24, 25 and 27 on the outlet side of the adsorber 13 are also closed. In order to desorb the solvent residues which are adsorbed on the activated carbon in the adsorber 13, the adsorber 13 is supplied by way of the vapor inlet valve 14 with saturated steam or water vapor which flows through the activated carbon from above in a downward direction therethrough. In that part of the procedure the water vapor or steam heats the activated carbon bed and desorbs the solvent. The solvent/water mixture which is produced in that case and which condenses beneath the activated carbon bed is fed by way of the outlet valve 15 and a discharge conduit (not shown) to a separation apparatus in which the solvent is separated from the water so that the solvent can be used again.

During that regeneration operation the activated carbon fill in the adsorber 13 is heated to about 120° C. and greatly saturated with steam. If the installation were to be switched over to the charging mode without any transitional phase after closure of the valves 14 and 15, the adsorber 13 would initially have an extremely poor adsorption efficiency.

In order to avoid that, each regeneration period is concluded by a drying phase, during which the inlet flap 18 and the second outlet flap 25 are opened but the outlet flaps 24 and 27 remain closed. In that way exhaust air which has been sucked out of the working space 2 can flow through the adsorber as a drying medium. Because of the poor level of efficiency of the adsorber, due to the high temperature involved, that air, after issuing from the adsorber, is not only hot and moist but it is also still heavily charged with solvent vapors. Although the air is cooled and moisture is removed therefrom in the condenser 29, there is nonetheless only an immaterial reduction in its solvent content. It is therefore returned to the flow path which goes from the working space 2 to the adsorbers 10–12 which are operating in the charging mode. There, that air is cleaned with the other exhaust air coming from the working space 2, in such a way that the first-mentioned air can be totally harmlessly fed into the main flow path 26 which leads back to the working space 2.

When the drying phase is concluded by closure of the second controllable outlet flap 25, the exhaust air which is fed to the adsorber 13 is initially always still very greatly heated and charged with moisture.

It is therefore not possible for that air to be recycled directly to the working space 2. The process described herein provides however that this air can be kept separate from the flows of air issuing from the other adsorbers 10–12 which have already been in the charging mode for a prolonged period of time and which are therefore already discharging air which is sufficiently cool and dry that it can be recycled to the working space 2 without the need for further conditioning, possibly after just filtering.

It is possible to deal in various ways with the air which issues from the adsorber 13 that is in the initial phase of a charging mode condition. In every case the associated first outlet flap 24 initially remains closed and the corresponding controllable auxiliary outlet flap 27 is opened so that the above-mentioned hot and moist air flows through the auxiliary flow path 28. By means of the heat exchanger 37, a part of the heat contained in that air can be recovered and put to further use.

Thereafter, that air can be passed directly into the discharge conduit 32 and through same into the chimney 45 which discharges it to the ambient atmosphere. If only that mode of operation is wanted, the heat exchanger 38, the branching arrangement 40 and the controllable flaps 42, 43 can be omitted.

In order to achieve a higher level of flexibility however those elements can be used to provide that the air which, in the initial phase of each charging mode condition of one of the adsorbers 10–13, flows through the auxiliary flow path 28 is cooled down in the heat exchanger 38 to such an extent that it can be fed into the return conduit 26 when the controllable flap 42 is open and the controllable flap 43 is closed.

The two options just described above are not mutually exclusive, in other words, a part of the air which flows through the auxiliary flow path 28 can also be discharged to the ambient atmosphere and the remainder, after suitable conditioning, can be fed into the return conduit 26. Finally, it is also possible for a part of the sufficiently cool and dry air coming from the adsorbers 10–12 which have already been operating in the charging mode for a prolonged period of time, which air flows in the return conduit 26, to be branched off at the branching arrangement 30 and passed into the discharge conduit 32. For that purpose, the flow resistance in the conduit 26 is increased by means of the controllable flap 33 and the controllable flap 31 is correspondingly opened wide. That is effected, for the purposes of maintaining a constant balance sheet in respect of the amounts of air involved, when a particularly large amount of fresh air is to be fed to the printing room 1 or the machine hood 2.

After a certain period of time, the initial phase of the charging period is terminated, in other words, the cleaned exhaust air which issues free the adsorber 13 and which has a residual solvent content of for example about 20 mg/cm³ has, of its own accord, reached such a low temperature and such a low moisture content that it can be readily recycled to the working space, in particular the machine hood 2 of the rotary intaglio printing machine. At that time which is determined either by way of a time control or preferably by means of the temperature measuring sensor 20 disposed downstream of the adsorber 13, the appropriate auxiliary outlet flap 27 is closed and instead the associated first outlet flap 24 is opened so that the cleaned exhaust air issuing free the adsorber 13 is recycled to the working space 2 by way of the return conduit 26.

A corresponding situation also applies in regard to the other adsorbers 10–12; when the above-described adsorber 13 is switched over free the regeneration mode into the charging mode, one of the other adsorbers 10–12 can change from the charging mode to the regeneration mode and can perform the same steps as have been described above.

The controllable flaps 33, 52 and 53 serve to feed the fresh air which is sucked in by means of the blower 48 directly to the printing room 1, in which case the air can be cooled by means of the heat exchanger 55 or heated by the heat exchanger 56, or the flaps 3, 52 and 53 serve to mix at least a part of that fresh air with the cleaned exhaust air flowing in the conduit 26.

The measuring sensors 60, 61; 64, 65; and 62, 63 serve to measure the moisture content and the temperature of the cleaned exhaust air, the fresh air which is supplied from the exterior and the mixture which is produced from those two air flows. Those measurement values can then be used to alter the ratio of the constituents of the mixture in such a way that the air which is returned to the machine hood 2 is set at the appropriately required values.

It will be seen from the foregoing that the process and the installation according to the invention can also be employed when the exhaust air which is sucked out of the working space 1, 2 is cleaned by means of more or fewer than four adsorbers. The only important consideration in this respect is that each adsorber provided, at the end of each regeneration period, performs the described drying phase to achieve the required level of adsorption efficiency and then, when it has been switched over from the regeneration mode to the charging mode, for the above-defined initial phase the exhaust air which has been cleaned by the adsorber is fed into the auxiliary flow path 28 from which it can be passed as required into the discharge conduit 32 leading to the chimney 45 or after suitable cooling and removal of moisture therefrom by way of the heat exchanger 38 into the return conduit 26. After termination of the initial phase, that is to say when the exhaust air issuing from the respective adsorber has reached appropriately advantageous values, it is then fed directly into the return conduit 26.

It will be appreciated that the above-described process and installation according to the invention have been set forth solely by way of example and illustration of the principles thereof and that various modifications and alterations may be made therein without thereby departing from the spirit and scope of the invention.

It will further be noted at this point that the reference numerals contained in the appended claims serve for ease of interpretation thereof and are not intended to have restrictive effect.

What is claimed is:

1. A process for removing solvent vapor from exhaust air which is sucked out of a working space, wherein the air is cleaned by being passed through at least two activated carbon adsorbers which are in mutually parallel relationship and each of which runs through operating cycles which each comprise a charging period in which the adsorber works in a charging mode in which the exhaust air flows through the adsorber and the adsorber adsorbs the solvent vapor contained in the exhaust air and a regeneration period in which the adsorber is separated from the flow of exhaust air and water vapor flows through the adsorber to desorb and flush out the previously adsorbed solvent; wherein the operating cycles of the at least two adsorbers are displaced relative to each other in respect of time in such a way that at least one of the adsorbers is always working in the charging mode, thereby to achieve a continuous adsorption procedure; wherein the regeneration period of each operating cycle includes a concluding drying phase in which, instead of water vapor, exhaust air from the working space flows through the respective adsorber, the exhaust air after leaving said adsorber being fed to a different adsorber which is working in the charging mode; and wherein each charging period includes an initial phase and a subsequent main phase, which are determined by virtue of the fact that the air flow issuing from an adsorber which is in the initial phase of a charging period is fed to a separate treatment while the air flow issuing from an adsorber which is in the main phase of a charging period is returned directly into the working space.

2. A process as set forth in claim 1 wherein the length of the initial phase of the charging period is established by means of a time control.

3. A process as set forth in claim 1 wherein the temperature of the air flow issuing from an adsorber which is operating in the charging mode is measured and the initial phase of the charging period is terminated when said temperature falls below a predeterminable limit value.

4. A process as set forth in claim 1 wherein the separate treatment provides that at least a part of the air flow which issues from an adsorber in the initial phase of the charging period and which is kept separate is cooled and thereafter returned into the working space.

5. A process as set forth in claim 1 wherein the separate treatment provides that at least a part of the air flow which issues from an adsorber in the initial phase of the charging period and which is kept separate is expelled into open air.

6. A process as set forth in claim 5 wherein the air expelled into the open air firstly passes through a heat exchanger to recover a part of the heat contained in the air.

7. A process as set forth in claim 5 wherein an amount of fresh air which approximately corresponds to the amount of air expelled into the open air is sucked in from the open air and is conditioned and fed to the working space.

8. A process as set forth in claim 7 wherein heat which is taken from the air expelled into the open air is used to heat the fresh air which is sucked in from the open air.

9. A process as set forth in claim 7 wherein the conditioned fresh air which is sucked in from the open air is directly fed to the working space.

10. A process as set forth in claim 7 wherein the fresh air which is sucked in from the open air is at least partially mixed with the air which is returned from the adsorbers in order to obtain an air mixture which is fed to the working space.

11. A process as set forth in claim 7 wherein the air which is returned from the adsorbers is fed to a region of the working space, that is different from the region to which conditioned fresh air is fed.

12. An installation for removing solvent vapor from exhaust air, comprising:

blower means (5) for sucking a flow of exhaust air to be cleaned out of a working space (2), at least first and second activated carbon adsorbers (10, 11, 12, 13) arranged in mutually parallel relationship, a control means, a control arrangement which is controllable by said control means and which, for each of the adsorbers (10, 11, 12, 13) includes an inlet valve means (18) which in the opened condition communicates it with said blower means (5); a main flow path (26); and a first outlet valve means (24) which in the opened condition passes air issuing from the adsorber (10, 11, 12, 13) into said main flow path (26); the arrangement being such that each of the adsorbers (10, 11, 12, 13), by a switching operation, is switchable to and fro between a charging mode in which exhaust air to be cleaned flows through the adsorber and the adsorber adsorbs solvent contained in the exhaust air and a regeneration mode in which the adsorber is separated from said flow of exhaust air and water vapor can flow through the adsorber for desorbing and flushing out the adsorbed solvent, the switching action between the charging and the regeneration modes occurring alternately in such a way that at least one of the adsorbers (10, 11, 12, 13) is always operating in the charging mode, and a discharge means (32, 45) by means of which said air issuing from one of the adsorbers (10, 11, 12, 13) can be expelled into open air, wherein the control arrangement further includes the following, for each adsorber (10, 11, 12, 13):

a second outlet valve means (25) and a conduit (19) which in the open condition of the second outlet valve means (25) is communicated thereby with the adsorber (10, 11, 12, 13) and by way of which said air issuing from the adsorber (10, 11, 12, 13) can be returned to the flow path leading from the working space (2) to the adsorbers (10, 11, 12, 13) so that said exhaust air from the working space (2) which flows through one of the adsorbers (10, 11, 12, 13) in a drying phase which concludes a period of time in which the adsorber operates in said regeneration mode when the inlet valve means (18) is open and the first outlet valve means (24) is closed can be fed by way of the opened second outlet valve means (25) to the at least one adsorber (10, 11, 12, 13) which is operating in the charging mode, and an auxiliary outlet valve means (27) and an auxiliary flow path (28) which in the open condition of the auxiliary outlet valve means (27) is communicated thereby with the adsorber (10, 11, 12, 13) so that air from the working space (2) which flows through the adsorber (10, 11, 12, 13) in an initial phase of its charging period when the inlet valve means (18) is open and the first and second outlet valve means (24, 25) are closed can be fed by way of said auxiliary flow path (28) to a separate treatment, and the main flow path (26) is communicated with the working space (2) so that air from the working space (2) which flows through the adsorber (10, 11, 12, 13) in a main phase following the initial phase of its charging period can be returned into the working space (2) after cleaning of said air.

13. An installation as set forth in claim 12 wherein each said valve means comprises a flap.

14. An installation as set forth in claim 12 wherein the control means includes a time control operable to predetermine the length of the initial phase.

15. An installation as set forth in claim 12 wherein for each adsorber (10, 11, 12, 13) the control means includes a temperature measuring device (20) for measuring the temperature of the cleaned air issuing therefrom, said device terminating the initial phase when the temperature of the issuing air falls below a predeterminable limit value.

16. An installation as set forth in claim 12 including a discharge chimney (45), a first cooling means (38) in the auxiliary flow path (28), and a change-over switching device (42, 43) which is connected to the auxiliary flow path and by means of which air flowing through it can be at least partially fed after suitable cooling into the main flow path (26) and at least partially passed to the discharge chimney (45).

17. An installation as set forth in claim 16 including a second cooling means (37) in the auxiliary flow path (28).

18. An installation as set forth in claim 17 including a suction and conditioning means (48, 50, 55, 56) for sucking fresh air from the surrounding atmosphere and conditioning it, said suction and conditioning means being adapted to feed the working space (2) with an amount of said fresh air which at least substantially corresponds to the amount of air which is discharged.

19. An installation as set forth in claim 18 wherein the suction and conditioning means (48, 50, 55, 56) includes a heat exchanger (56) for heating the sucked-in fresh air.

20. An installation as set forth in claim 19 including a common heat exchange medium circuit communicating the heat exchanger (56) for heating the sucked-in fresh air with one of said first or second cooling means (37, 38) of the auxiliary flow path (28).

21. An installation as set forth in claim 18 wherein the suction and conditioning means (48, 50, 55 56) includes a heat exchanger (55) for cooling the sucked-in fresh air.

22. An installation as set forth in claim 18 including a mixing means (33, 52, 53) for mixing at least a part of the fresh air sucked in from the surrounding atmosphere with air which is returned from the adsorbers (10, 11, 12, 13).

* * * * *